United States Patent [19]

Hu

[11] Patent Number: 5,755,090
[45] Date of Patent: May 26, 1998

[54] PILOT INJECTOR FOR GAS TURBINE ENGINES

[75] Inventor: Aaron S. Hu, Hartford, Conn.

[73] Assignee: United Technologies Corporation, Hartford, Conn.

[21] Appl. No.: 705,036

[22] Filed: Aug. 29, 1996

Related U.S. Application Data

[63] Continuation of Ser. No. 285,588, Jun. 24, 1994, abandoned.

[51] Int. Cl.$^6$ .................... F02C 7/22; F02C 7/262
[52] U.S. Cl. .............................. 60/39.091; 60/746
[58] Field of Search ............... 60/39.091, 39.141, 60/39.142, 39.27, 734, 746, 747

[56] References Cited

U.S. PATENT DOCUMENTS

| | | | |
|---|---|---|---|
| 3,611,282 | 10/1971 | Hill | 340/27 |
| 5,097,666 | 3/1992 | Shekleton et al. | 60/737 |
| 5,265,414 | 11/1993 | Mouton | 60/39.091 |
| 5,303,684 | 4/1994 | Brown et al. | 123/435 |
| 5,305,596 | 4/1994 | Lampe et al. | |
| 5,313,778 | 5/1994 | Sweet et al. | |
| 5,452,574 | 9/1995 | Cowell et al. | 60/746 |

FOREIGN PATENT DOCUMENTS

| | | | |
|---|---|---|---|
| A-0501313 | 9/1992 | European Pat. Off. | F23R 3/26 |
| A-0509953 | 10/1992 | European Pat. Off. | F02C 9/28 |
| 0 592 223 A1 | 4/1994 | European Pat. Off. | F02C 7/264 |
| 56-119423 | 9/1981 | Japan | F23R 3/00 |
| 4076232 | 3/1992 | Japan | F02C 9/00 |
| A-625335 | 6/1949 | United Kingdom | 75/110 |

OTHER PUBLICATIONS

"High Efficiency Industrial Gas Turbines For Cogeneration", W. H. Day, CONAE Cogen Conference, Mixico City, Jun. 24, 1993, pp. 1–14.

"Emission and Performance of a Lean–Premixed Gas Fuel Injection System For Aeroderivative Gas Turbine Engines", Snyder, Rosfjord, McVey (UTRC) and Hu and Schlein (PWA), pp. 1–7 (Jun., 1994).

"Comparison of Liquid Fuel/Air Mixing and Combustor $NO_x$ Emissions For a TE Nozzle Swirling Flowfield", Snyder, Rosfjord, McVey, Chiappetta (UTRC) pp. 1–16 and Figs. 1–18 (Jun. 1994).

*Primary Examiner*—Louis J. Casaregola

[57] ABSTRACT

A combustor is disclosed capable of averting engine flameout. This combustor comprises a combustion chamber, which comprises an outlet for discharging heated combustion products. The combustor further comprises a primary injector for injecting a fuel and compressed air into a primary zone of the combustion chamber such that the fuel is induced into a recirculation zone at a corner of the primary zone. Combustion means for combusting the fuel and the compressed air in the combustion chamber resulting in heated combustion products are also incorporated in the combustor. Moreover, the combustor comprises sensing means for monitoring the combustor to substantially detect a pre-flameout condition. To realize the advantages of the present invention, the combustor additionally comprises a pilot injector for injecting a propellant into the recirculation zone in response to detecting said flameout condition by the sensing means, such that the propellant combusts as a diffusion flame.

2 Claims, 1 Drawing Sheet

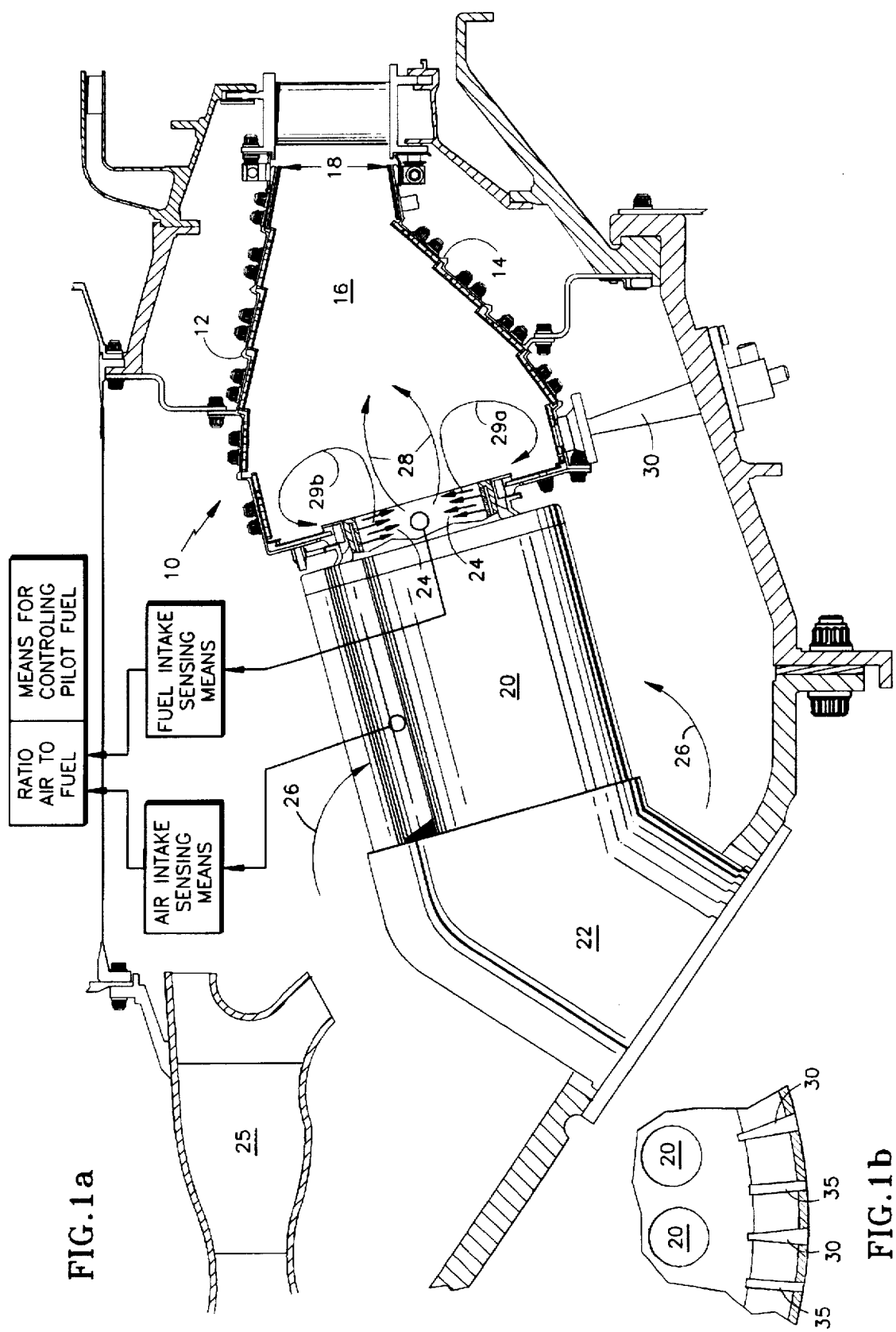

PILOT INJECTOR FOR GAS TURBINE ENGINES

CROSS REFERENCE TO RELATED APPLICATIONS

This application discloses and claims material related to a patent application entitled "Pressure Vessel Fuel Nozzle Support for an Industrial Gas Turbine Engine," commonly assigned with the present invention, having a Docket No. TPM-181, a Ser. No. 08/267,102, filed on Jun. 24, 1994 (U.S. Pat. No. 5,564,271).

This is a Continuation of Ser. No. 08/285,588 filed Jun. 24, 1994 (now abandoned).

FIELD OF THE INVENTION

The present invention relates to a pilot injector for preventing engine flameout.

BACKGROUND OF THE INVENTION

Known for power generation, gas turbine engines have been employed in various applications. These include airborne and marine propulsion systems, as well as land based electrical generators.

Gas turbine engines burn a hydrocarbon fuel and discharge a stream of byproducts which comprise pollutants. Of these pollutants, nitrogen oxide, hereinafter referred to as $NO_x$, is of most concern because of its effect on the environment.

As a result of these environmental concerns, the turbine industry has examined methods for reducing $NO_x$ production in their engines. It is well known that a direct causal relationship exists between $NO_x$ emissions and the reduce $NO_x$ emissions, the turbine industry has turned to designing turbine engines which can operate in a "lean" mode. Lean mode of operation refers to a substantially low ratio of fuel to air as it is employed within the engine for combustion purposes. Lean mode of gas turbine engine operation can be best understood by the following formula:

$$\phi = [\text{parts of fuel/parts of air}] * [1/\alpha]$$

where $\alpha$ represents a constant, and $\phi$ represents an equivalence ratio. For methane gas, the value of $\alpha$ is equal to 0.0585, such that the engine's operation is termed "stoichiometric" when equivalence ratio represented by $\phi$ is equal to 1, and "rich" when the equivalence ratio $\phi$ is greater than 1. In contrast, the engine is labeled lean when equivalence ratio $\phi$ is valued at less than 1.

Several issues may arise when operating gas turbine engines in a lean mode. Of most significance is the potential for an engine "flameout." Flameout generally occurs when an engine operates with an substantially lean mixture of fuel with air—an overly low fuel to air ratio—and results in extinguishing the engine's internal combustion flame. From a numerical perspective, when using methane gas, the equivalence ratio $\phi$ of a lean condition has been estimated to be substantially in the range of 0.47 to 0.50. It should be apparent to one of ordinary skill in the art, however, that this range—0.47 to 0.50—of the equivalence ratio $\phi$ as an expression of the lean mode of operation of a turbine engine using methane gas leading to engine flameout is merely an estimation of a general range depending on the operating conditions and geometry. For a precise measurement of the equivalence ratio $\phi$ during flameout, additional consideration must be taken into account.

Upon an engine flameout condition, the engine must be restarted. This can be costly and time consuming. Further, depending on the engine's application, an engine flameout can be potentially dangerous. As such, there remains a need in the turbine industry for a device which prevents flameout while still allowing the engine to operate in a lean mode. There is a demand, moreover, in the turbine industry for an anti-flameout device which does not require additional moving parts.

SUMMARY OF THE INVENTION

The primary advantage of the present invention is to provide a device that will prevent flameout while still allowing the engine to operate in a lean mode.

A further advantage of the present invention is to provide an anti-flameout device which does not require additional moving parts.

In order to achieve the advantages of the present invention, a preferred improved combustor is disclosed for combusting and discharging heated combustion products. The combustor comprises a combustion chamber. To enable the discharge of heated combustion products, the combustion chamber comprises an outlet. The combustor further comprises a primary injector for injecting a fuel and compressed air into a primary zone of the combustion chamber such that the fuel is induced into a recirculation zone. Combustion means for combusting the fuel and the compressed air in the combustion chamber resulting in heated combustion products are also incorporated in the combustor. Moreover, the combustor comprises sensing means for monitoring the combustor to substantially detect a pre-flameout condition. To realize the advantages of the present invention, the combustor additionally comprises a pilot injector for injecting a propellant into the recirculation zone in response to detecting said flameout condition by the sensing means, such that the propellant combusts as a diffusion flame.

In an alternate embodiment of the present invention, the improved combustor for combusting and discharging heated combustion products comprsies an inner and outer annular wall joined at the forward end by a metal wall or bulhead to form a combustion chamber. Further, the combustor further comprises an open end at the aft for the discharge of heated combustion products. The combustor also comprises a primary combustor for mixing fuel and air and injecting them into the combustion chamber in a manner to achieve low $NO_x$ and stable combustion at high power operation. An additional fuel injection device injects fuel into the recirculation zone in the corner of the combustor to preclude flameout at low power operation. The additional fuel injector and attendant fuel manifolds are activated through fuel controls. The fuel controls may be preset to open and closed based upon operating signals from the engine, such as speed, temperature, and fuel flow, for example. Alternatively, the fuel controls may be activated by a sensing device which substantially monitors the combustor for a pre-flameout condition and initiates the additional fuel injector to feed fuel to the recirculation zone at the corner of the primary zone.

BRIEF DESCRIPTION OF THE DRAWINGS

The present invention will be better understood from reading the following description of non-limitative embodiments, with reference to the attached drawings, wherein below:

FIGS. 1a and 1b illustrate a sectional and a cross-sectional view of the present invention.

It should be emphasized that the drawings of the instant application are not to scale but merely representations not intended to portray the specific parameters or the structural details of the invention, which can be determined by one of ordinary skill in the art by examination of the information herein.

DETAILED DESCRIPTION OF THE INVENTION

Referring to FIGS. 1a and 1b, sectional and cross-sectional views of an improved combustor 10 of the present invention are shown. In the preferred embodiment, combustor 10 comprises an annular shape and is employed in a land based gas turbine engine for combusting and discharging heated combustion products.

In the preferred embodiment of the present invention, combustor 10 is defined by an inner annular wall 12 and an outer annular wall 14 joined at forward end by a metal wall or bulkhead to form an annular combustion chamber 16. Alternatively, in another embodiment, combustor 10 is defined by a plurality of combustor cans. Combustion chamber 16 comprises an outlet 18 positioned at the chamber's aft end for discharging heated combustion products formed as a result of combustion within the chamber. It should be apparent to one of ordinary skill in the art that as combustor 10 is preferably annular in shape, so too is combustion chamber 16.

Coupled with combustor 10 and its combustion chamber 16 is a nozzle or injector 20. Nozzle 20 is supported within the detailed turbine structure by a nozzle support 22. Fuel 24, which may comprise a liquid or gaseous form, is injected via nozzle 20 though a series of orifices (not shown) or other devices known to one of ordinary skill in the art. Nozzle 20 also receives compressed pressurized air 26 from a compressor diffuser 25 through a first and second air slot, as detailed in co-pending application entitled "Pressure Vessel Fuel Nozzle Support for an Industrial Gas Turbine Engine," commonly assigned with the present invention, or other similarly known means. By this arrangement, nozzle 20 injects a mixture of fuel and air into the chamber 16. In the present invention, this mixture is preferably lean, comprising a low fuel to air ratio to achieve substantially low $NO_x$ emissions through exhaust 18, yet sufficient enough to support stable combustion at high power operation.

By injecting the fuel and compressed air mixture into the chamber 16, a primary zone 28 of the nozzle's output is created within the combustion chamber 16. As a result of the formation of primary zone 28, a first and a second recirculation zone 29a and 29b are inductively created at the corners of primary zone 28.

Once the fuel and compressed air are input into combustion chamber 16, the mixture is ignited by a combustion means 35 shown in the cross sectional perspective of FIG. 1b. In the preferred embodiment of the present invention, combustion means 35 comprises an ignitor.

Furthermore, the combustor of the present invention comprises a sensing means. Fuel flow is sensed by flow sensor and airflow quantity by airflow sensor. The ratio of the measurements is then determined. The sensing means of the present invention senses the condition of the combustor and engine flameout. In the one embodiment of the present invention, the sensing means comprises a sensor for monitoring a quantifiable engine characteristic relative to engine flameout. These characteristics include but are not limited to the exit temperature or pressure of the discharged heated combustion products, fuel flow and engine speed, as well as the instantaneous power of the engine. Other measurable characteristics are known to one of ordinary skill in the art.

Further, several other sensor means are known in the art for detecting engine flameout, including those proposed in U.S. Pat. No. 3,611,282, U.S. Pat. No. 5,265,414, and U.S. Pat. No. 5,303,684, all incorporated herein by reference.

The sensing means employed in the present invention functionally detects a "pre-flameout" condition in the engine. A pre-flameout condition is defined as a point wherein the engine is substantially near flameout, such that without outside stimuli the engine will in fact flameout. As described hereinabove, when an engine is at pre-flameout, the mixture of fuel to air is too lean. Given the relationship between the mixture of fuel to air and the flameout condition, the sensing means in another embodiment of the present invention can be realized by a compressed air intake measuring means for making compressed air intake measurements and a fuel intake measuring means for making fuel intake measurements. The sensing means in this embodiment further comprises a means for controlling a pilot injector 30, described hereinbelow, in response to the ratio of compressed air and fuel measurements.

To realize the benefits of the present invention, the improved combustor 10 comprises a pilot injector 30 and an attendant propellant manifolds (not shown). Both pilot injector 20 and attendant propellant manifolds are activated through a control signal generated by the sensor means. Pilot injector 30 operates in conjunction with the sensor means as an anti-flameout device at low power operation. Pilot injector 30 achieves this goal by injecting a propellant into at least one recirculation zone 29a or 29b when detecting a pre-flameout condition.

The propellant employed may be liquid or gaseous, and is preferably identical in composition to fuel 24. In one embodiment of the present invention, the pilot injector 30 includes the capability for both liquid and gaseous fuel.

By injecting the propellant into a recirculation zone 29a or 29b, the mixture within that recirculation zone becomes less lean to shift the combustor operation mode away from a flameout. The velocity of the air in the recirculation zone 29a or 29b is lower and the fuel-air mixture is richer than in the primary zone 28 leading to a more stable operating environment. The fuel and air in this region are not premixed and the resulting diffusion flame has greater stability limits than the premixed flame of the primary zone 28.

Pilot injector 30 may be positioned in several locations within the combustor that can access either recirculation zone 29a or 29b. In the preferred embodiment, pilot injector 30 is positioned at a sidewall along the outer liner 14 of the combustor chamber 16. However, pilot injector 30 may also be positioned at a sidewall along the inner liner 14 of the combustor chamber 16. Further, in another embodiment of the present invention, pilot injector 30 is positioned a front wall of the combustor chamber 16.

It should be apparent to one of ordinary skill that the timing associated with the sensing means, as well as pilot injector 30 must be taken into consideration when configuring the present invention. This is particularly an issue because delays exist with regards to the sensing means. As such, to avoid a potential flameout, the pre-flameout level of operation which triggers the pilot injector 30 must be calibrated accordingly to compensate for these delays.

While the particular invention has been described with reference to illustrative embodiments, this description is not meant to be construed in a limiting sense It is understood that although the present invention has been described in a preferred embodiment, various modifications of the illustrative embodiments, as well as additional embodiments of the invention, will be apparent to persons skilled in the art upon reference to this description without departing from the spirit of the invention, as recited in the claims appended hereto. Thus, for example, the combustor of the present invention can be employed in land based and airborne gas turbine engines, as well as other devices requiring an improved combustor for combusting and discharging heated combustion products and having an anti-flameout apparatus. It is therefore contemplated that the appended claims will cover any such modifications or embodiments as fall within the true scope of the invention.

All of the U.S. Patents cited herein are hereby incorporated by reference as if set forth in their entirety.

What is claimed is:

1. A combustor for combusting and discharging heated combustion products comprising:

a combustion chamber having an outlet for discharging heated combustion products;

a primary injector for injecting a mixture of a fuel and compressed air into a primary zone of said combustion chamber such that said mixture is induced into a recirculation zone;

combustion means for combusting said mixture in said combustion chamber resulting in the heated combustion products;

sensing means for monitoring the combustor to substantially detect a pre-flameout condition comprising a compressed air intake measuring means for making compressed air intake flow measurements;

a fuel intake measuring means for making fuel intake flow measurements; and means for controlling a pilot injector in response to the ratio of said compressed air intake measurements and said fuel intake measurements;

said pilot injector for injecting a propellant into said recirculation zone in response to detecting said pre-flameout condition by said sensing means, such that said propellant combusts as a diffusion flame to thereby control the stability of the combustor.

2. An engine comprising a combustor for combusting and discharging heated combustion products, said combustor comprising:

a combustion chamber having an outlet for discharging heated combustion products;

a nozzle for injecting a mixture of a fuel and pressurized air into a primary zone of said combustion chamber such that a recirculation zone comprising said mixture is formed;

an ignitor for combusting said mixture in said combustion chamber resulting in the heated combustion products;

sensing means for monitoring the combustor to detect a substantially pre-flameout condition comprising a pressurized air intake measuring means for making pressurized air intake flow measurements;

a fuel intake measuring means for making fuel flow intake measurements; and means for controlling a pilot injector in response to the ratio of said pressurized air intake measurements and said fuel intake measurements;

said pilot injector for injecting a propellant into said recirculation zone in response to detecting said pre-flameout condition by said sensing means, such that said propellant combusts as a diffusion flame to thereby control the stability of the combustor.

* * * * *